United States Patent

Park et al.

[11] Patent Number: 5,881,307
[45] Date of Patent: Mar. 9, 1999

[54] DEFERRED STORE DATA READ WITH SIMPLE ANTI-DEPENDENCY PIPELINE INTER-LOCK CONTROL IN SUPERSCALAR PROCESSOR

[75] Inventors: Heonchul Park, Cupertino; Seungyoon Peter Song, Los Altos, both of Calif.

[73] Assignee: Samsung Electronics Co., Ltd., Seoul, Rep. of Korea

[21] Appl. No.: 805,389

[22] Filed: Feb. 24, 1997

[51] Int. Cl.[6] .............................. G06F 9/40; G06F 9/30; G06F 9/38
[52] U.S. Cl. ...................................... 395/800.23; 395/385
[58] Field of Search .................................. 395/384, 394, 395/393, 800.23, 376, 391, 191, 800.24, 385, 381, 800.22; 364/DIG. 1, DIG. 2

[56] References Cited

U.S. PATENT DOCUMENTS 5,163,139  11/1992  Haigh et al. .............................. 395/394
5,651,125   7/1997  Witt et al. ................................. 395/394

Primary Examiner—Daniel H. Pan
Attorney, Agent, or Firm—Skjerven, Morrill, Macpherson, Franklin & Friel David T. Millers

[57] ABSTRACT

A superscalar processor includes an execution unit that executes load/store instructions and an execution unit that executes arithmetic instruction. Execution pipelines for both execution units include a decode stage, a read stage that identify and read source operands for the instructions and an execution stage or stages performed in the execution units. For store instructions, reading store data from a register file is deferred until the store data is required for transfer to a memory system. This allows the store instructions to be decoded simultaneously with earlier instructions that generate the store data. A simple antidependency interlock uses a list of the register numbers identifying registers holding store data for pending store instructions. These register number are compared to the register numbers of destination operands of instructions, and instructions having destination operands matching a source of store data are stalled in the read stage to prevent the instruction from destroying store data before an earlier store instruction is complete.

14 Claims, 6 Drawing Sheets

5,881,307

DEFERRED STORE DATA READ WITH SIMPLE ANTI-DEPENDENCY PIPELINE INTER-LOCK CONTROL IN SUPERSCALAR PROCESSOR

BACKGROUND

1. Field of the Invention

This invention relates to processors and to methods for executing store instructions and handling instruction antidependencies in a superscalar processor.

2. Description of Related Art

Superscalar processors execute instructions in a linear program thread but include multiple execution units capable of executing instructions in parallel. Parallel execution of instructions improves processor performance by increasing the rate at which instructions are completed but completes some instructions out of the program order, (i.e. before or simultaneously with instructions earlier in the program order.) A superscalar processor must avoid out-of-order execution if completing a later instruction before an earlier instruction fails to implement the program logic. For example, a later instruction that depends on the result from an earlier instruction must be completed after that result is available. A restriction on the order of execution or completion of two instructions is often referred to as an instruction dependency or antidependency.

Superscalar architectures that properly handle instruction dependencies and antidependencies have been developed. One such architecture uses register renaming which allows out-of-order execution but delays committing results to a register file until earlier dependent or antidependent instructions are completed. Architectures with register renaming tend to be complex and therefore expensive to implement.

Another superscalar architecture uses an interlock that stalls decoding or issuing of later instructions having dependencies or antidependencies with earlier pending instructions. However, delaying instruction decoding or issuing can degrade processor performance. For example, a store instruction that requires data from a register in a register file cannot read that data until one or more earlier instructions write the data to the register. In a typical, superscalar architecture a read stage that reads from a register file is early in an execution pipeline and a write stage that writes to the register file is the last stage in the execution pipeline. Accordingly, a pipeline interlock can create a bubble of processor inactivity between decoding of an instruction that writes to a register and a following store instruction that reads from the register. A superscalar architecture is sought that permits a simple pipeline interlock but reduces the bubbles of processor activity that degrade processor performance.

SUMMARY

In accordance with the invention, a superscalar processor defers reading of store data until an execution unit requires the store data for transfer to a memory system. Accordingly, operands for an address calculation can be read, an address calculation can be performed, and the load/store unit can wait for a response from the memory system in parallel with execution and completion of an instruction that generates the store data.

In one embodiment of the invention, a processor that decodes and executes most instructions in the program order can decode a store instruction that reads store data from a register simultaneously with an earlier instruction that writes to the register. Source operands for the two instructions are read from a register file simultaneously in a first cycle, an address for the store instruction is calculated simultaneously with an execution of the earlier instruction in a second cycle, and the result from the earlier instruction is likely to be available for use as store data when a memory system is ready for the store data. The special treatment of store operands and the possible out-of-order execution of load/store instructions improves processing power but avoids the complexity required for full out-of-order execution.

In another embodiment of the invention, a processor includes dual execution pipelines. A first pipeline decodes and executes instructions that write results to a register file. A second pipeline decodes and executes load/store instructions that access a memory system. The processor restricts simultaneous decoding of instructions for the first and second pipelines to the case where the instruction decoded in the first pipeline is earlier in the program order than the instruction decoded in the second pipeline. Thus, most instructions are executed in the program order which simplifies dependency and antidependency handling.

A store scoreboard for this embodiment includes a list of register numbers identifying the sources of store data for issued store instructions. A register number is added to the list when a store instruction is issued, and cleared when a store instruction is completed by reading that register. An interlock system stalls issue of an instruction if a destination operand of the instruction corresponds to one of the register numbers in the scoreboard. This prevents later instructions from writing to a register before an earlier store instruction has read the store data.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an aspect of the invention, a superscalar processor with an interlock architecture defers reading of store data for store instructions and allows decoding and issue of a store instruction before earlier instructions generate the store data. The execution unit can determine an effective address and begin access of a memory system while an earlier instruction completes and provides the store data. Delaying access of store data until a memory system is ready for the store data reduces bubbles of execution unit inactivity when a store instruction depends on earlier instructions for store data. As a further advantage of the invention, storage of temporary store data awaiting transfer to the memory system can be reduced or eliminated because the store data is held in the register file until the memory system is ready. The processor further implements a simple antidependency interlock to delay execution of later instructions that would overwrite the store data before the store instruction reads the store data.

Figure 1:
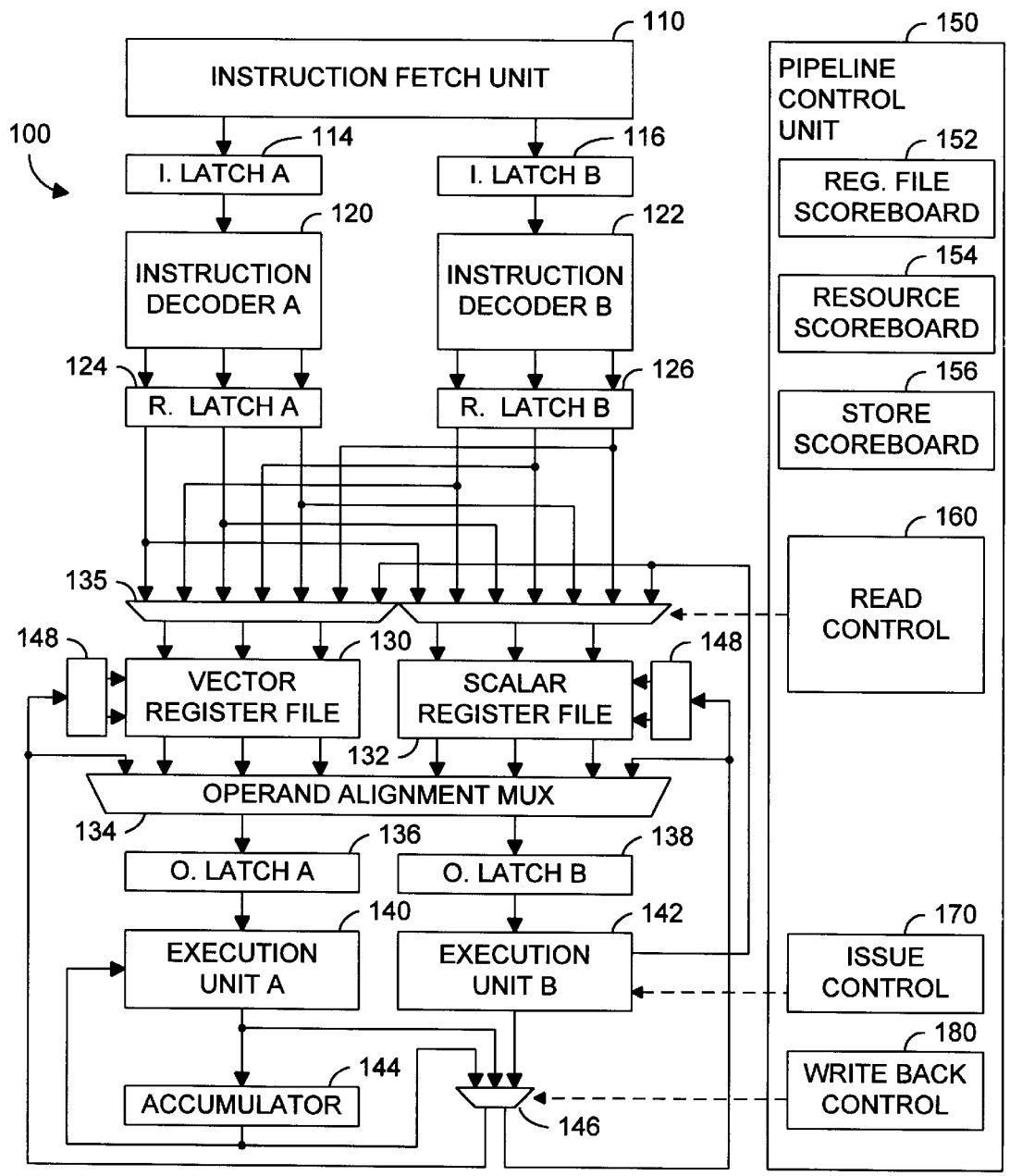
FIG. 1 is a block diagram of a processor in accordance with an embodiment of the invention.

FIG. 1 illustrates a single instruction stream-multiple data stream (SIMD) processor 100 in accordance with an embodiment of the invention. SIMD processor 100 is a superscalar processor and includes an instruction fetch unit (IFU) 110, dual instruction decoders 120 and 122, a vector register file 130, a scalar register file 132, and dual execution units 140 and 142. IFU 110 fetches instructions from a memory system such as an instruction cache coupled to main memory, executes branch and program control instructions, and loads instructions into latches 114 and 116 for decoders 120 and 122, respectively. IFU 110 fetches instructions and decoders 120 and 122 decode instructions in the program order except when decoders 120 and 122 simultaneously decode instructions from latches 114 and 116.

Instruction decoder 120 decodes instructions that manipulate source operands to generate a result that may be stored in destination register. For example, instruction decoder 120 decodes arithmetic instructions that add, subtract, multiply, or divide source operands to determine a result that is stored in the destination register. Instruction decoder 122 decodes load/store instructions that access memory. In the exemplary embodiment, instruction decoder 122 also decodes branch instructions that require data or conditions codes returned to IFU 110 and inter-element move instructions which shift or otherwise move data elements within source operands. U.S. patent application Ser. No. 08/699,597, filed Aug. 19, 1996, entitled "SINGLE-INSTRUCTION-MULTIPLE-DATA PROCESSING IN A MULTIMEDIA SIGNAL PROCESSOR" describes an instruction set suitable for processor 100 and is incorporated by reference herein in its entirety. In an alternative embodiment of the invention, decoder 122 solely decodes load/store instructions or just store instructions.

Decoders 120 and 122 extract register numbers and store the register numbers in latches 124 and 126 when decoding instructions. Each register number identifies a register in a register file including vector register file 130 and scalar register file 132. In the exemplary embodiment, vector register file 130 contains 64 32-byte (or 256-bit) vector registers, where each of vector registers stores a data vector containing multiple data elements. For example, a 32-byte data vector may contain 32 8-bit data elements, 16 16-bit data elements, or 8 32-bit data elements. The vector registers in a current bank are referred to herein as VR0 to VR63. Scalar register file 132 contains 32 32-bit scalar registers, each of which holds a single 32-bit value. The scalar registers are referred to herein as SR0 to SR31. The terminology Ri for i between 0 and 31 refers to a register that can be either a vector or scalar register.

A read control circuit 160 in pipeline control unit 150 controls multiplexers 135 to select registers that are read from register files 130 and 132. The register numbers in latches 124 and 126 identify source operands needed for the instruction or instructions that decoders 120 and 122 last decoded. Additionally, read control circuit 160 may select a register number identifying a store operand for a store instruction pending in execution unit 142.

Each of vector register file 130 and scalar register file 132 has three read ports so that a maximum of six source operands can be read per cycle. In the process of selecting register to be read during a clock cycle, read control 160 checks a register file scoreboard 152 to determine whether any pending instructions write to any of the source operands. If an instruction requires a source operand in register file 130 or 132 that will not be valid next cycle because a pending instruction is not completed, read control 160 prevents that source operand from being read from register file 130 or 132. Other source operands for the instruction can be read for possible issue of the instruction because the source operand that is not valid in register file 130 or 132 may be forwarded from execution unit 140 or 142.

In the instruction syntax of the exemplary embodiment, each instruction has three or fewer source operands, but two instructions advancing to a read stage can require more than three simultaneous reads from vector register 130 or scalar register 132. Additionally, reading store data for an issued store instruction, may be required at the same time that two instructions attempt to advance to read stage. If, after eliminating reads for source operands with dependencies, instructions still require more than three vector operands from register file 130 or more than three scalar operands from register file 132, read control circuit 160 selects the register number for the pending store instruction alone or with the register numbers for the instruction that decoder 120 last decoded, i.e. the next instruction in the program order. The instruction that decoder 122 decoded is stalled so that latch 126 holds the previously decoded register numbers, and no new instruction are decoded during the next clock cycle. Decoder 120 is similarly stalled if the last instruction decoded cannot advance to the read stage simultaneously with reading store data for a pending store instruction.

If decoders 120 and 122 are not stalled, IFU 110 loads the next instruction in the program order into latch 114 or 116. IFU 110 loads instructions in parallel into latches 114 and 116 for possible decoding and execution in parallel if decoder 120 can decode the next instruction in the program order and decoder 122 can decode an instruction immediately following the next instruction in the program order. Otherwise, IFU 110 loads at most one instruction, the next instruction in the program order, into latch 114 or 116. The requirement on the order of parallel instruction decoding simplifies dependency checking since load/store instructions are always later in the program order than the instruction decoded in parallel.

Figure 2A:
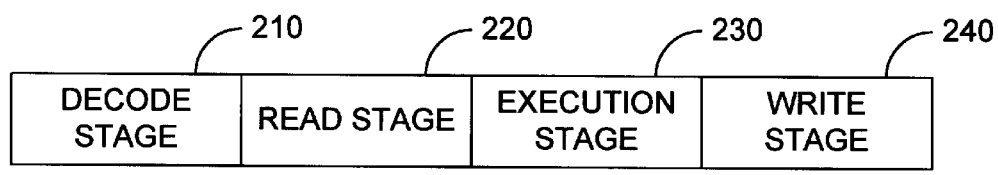
FIGS. 2A and 2B illustrate respective execution pipelines for arithmetic and store instructions executed by the processor of FIG. 1.

FIG. 2A illustrates an instruction pipeline that includes a decode stage 210, a read stage 220, an execution stage 230, and a write stage 240 for an arithmetic and logic (ALU) instruction. During decode stage 210, decoder 120 decodes an instruction from latches 114 and source operand register numbers are written in latch 124. During read stage 220, registers identified by register numbers from latch 124 are read from register files 130 and/or 132, and an operand alignment multiplexer 134 selects the data read from register files 130 and 132 and/or results forwarded from execution units 140 and 142 when storing source operands in a latch 136 for execution unit 140.

An issue control circuit 170 in pipeline control unit 150 determines whether the instruction can advance to execution stage 230. An instruction is only allowed to advance from read stage 220 to execution stage 230 if all source operands for the instruction are valid, the instruction does not have write-after-write (WAW) dependency on an instruction being executed by execution unit 140 or 142, the instruction does not write to a register that supplies store data to a store instruction pending in execution unit 142, and issuing the instruction does not cause a resource collision in execution unit 140.

The source operands in latch 136 read from register files 130 and 132 are always valid, but a forwarded source operand is not valid until execution unit 140 or 142 completes the earlier instruction that supplies the operand. If an earlier instruction that supplies a source operand did not complete last cycle, the instruction is stalled with latch 136 holding some valid source operands for the instruction. During subsequent clock cycles, when a needed source operand is forwarded, the forwarded operand is stored in latch 136 and validated. Stalling issue of an instruction for execution unit 140 prevents issue of any instructions to execution unit 142, and stalls decoders 120 and 122 once latch 124 and/or latch 126 contain the register numbers for decoded instructions.

For WAW dependency, issue control circuit 170 checks register file scoreboard 152 to determine whether any pending instruction in execution pipeline 140 or 142 writes to a destination register of the instruction having operands in latch 136. If there is a WAW dependency, issue control circuit 170 does not issue the instruction to execution stage 230, and latch 136 holds the operands for the instruction while the instruction remains stalled in read stage 220.

If the instruction having source operands in latch 136 has a destination register that is the same as the source of store data for a store instruction pending in execution unit 142, there is an antidependency between the ALU instruction and the store instruction, and issue control circuit 170 stalls the instruction in read stage 220 until the store instruction is complete. To detect antidependencies, issue control circuit 170 compares the register number of destination operand of the instruction to register numbers listed in a store scoreboard 156. Stalling such instructions ensures that the store data will not be overwritten until used by the store instruction.

Issue control circuit 170 also checks a resource scoreboard 154 to determine whether issue of the instruction to execution stage 230 will cause a resources conflict in execution unit 140 during the next clock cycle or following clock cycles. Issuing an instruction to execution stage 230 starts execution unit 140 processing the source operands from operand latch 136. In the exemplary embodiment, execution unit 140 has a 32-byte data path and for vector operands preforms 32, 16, or 8 parallel arithmetic operations, depending on the data type for data elements. Execution stage 230 for most instructions requires one clock cycle. Some instructions such as instructions that perform a multiply operation on integer data elements, require two clock cycles for execution stage 230. Instructions that perform arithmetic operations on data elements having a floating point data type require three clock cycles. Resource scoreboard 154 indicates which resources in execution unit 140 pending multi-cycle instruction will be available during the next clock cycle.

Upon completion of execution stage 230, the instruction enters write stage 240 in which results are written to register files 130 and 132. A write back control circuit 180 controls the routing of the results from execution units 140 and 142 and output from an accumulator 144. The results from execution unit 140 can be stored in accumulator 144 or routed through a multiplexer 146 to a latch 148 for writing to register file 130 or 132 during a write stage and to operand alignment multiplexer 134 for operand forwarding.

In the exemplary embodiment, each of register files 130 and 132 has two write ports. However, execution unit 140 can produce one vector result or one scalar result, and execution unit 142 can produce one or two results including up to two scalar results. If three scalar results are available from execution units 140 and 142 during one clock cycle, write back control 180 writes the results from execution unit 142 to register files 132, and stalls execution unit 140. Results from execution unit 140 are written to register file 132 during the following clock cycle.

Figure 2B:
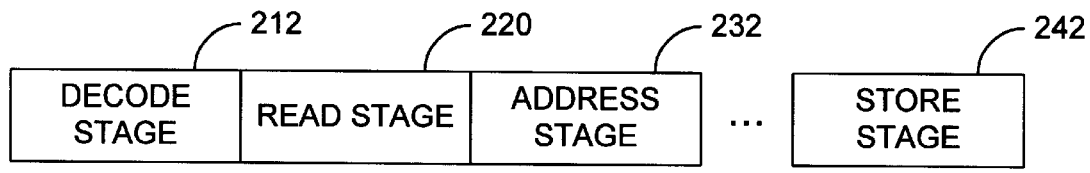

FIG. 2B illustrates an instruction pipeline for store instructions. Store instructions require a decode stage 212, read stage 220, an address stage 232, and a store stage 242. During decode stage 212, register numbers indicating the source operands required for calculation of an address are extracted from the store instruction and stored in latch 126 for reading from scalar register file 132 during read stage 220. Issue control 170 issues the store instruction to address stage 232 if latch 138 holds valid source operands for an address calculation and execution unit 142 is available for the instruction. Execution unit 142 then waits until a memory system is ready to receive an effective address and store data from execution 142. Once the memory system is ready, execution unit 142 requests that read control circuit 160 read or forward the store data to latch 138. Store stage 242 begins one or more clock cycles after the end of address stage 232 depending on when the memory system and the store data become available in register 138.

Figure 3:
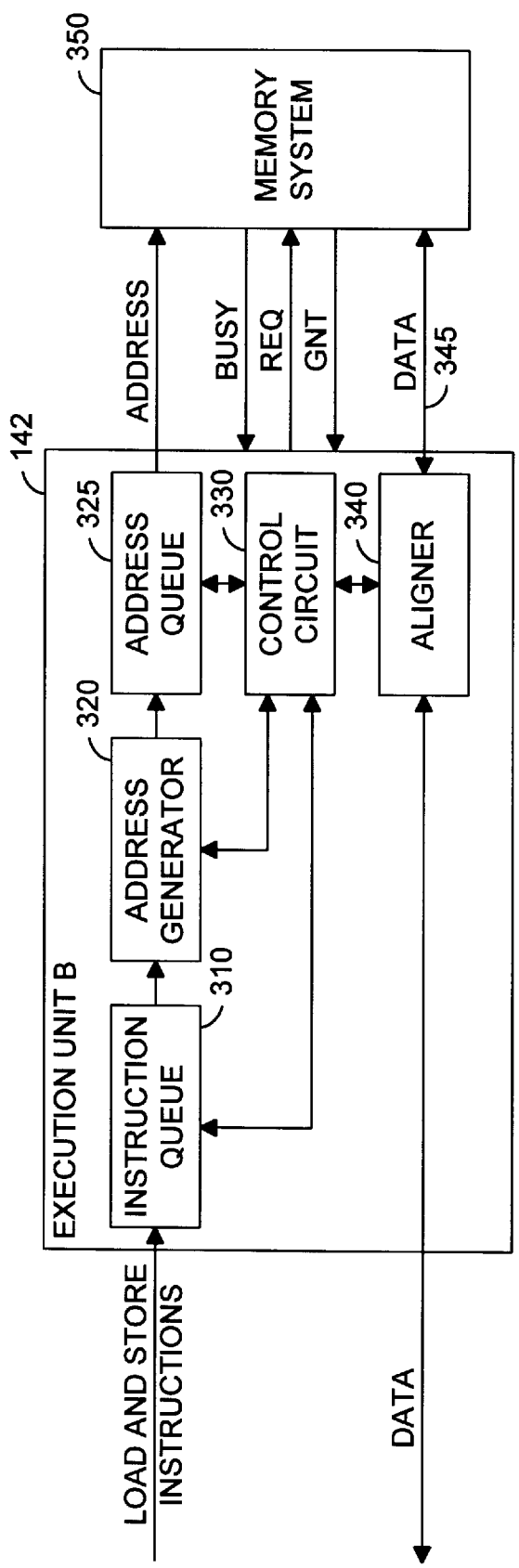
FIG. 3 is a block diagram of an execution unit for store/load and data element shift instructions.

FIG. 3 shows an embodiment of execution unit 142 connected a memory system 350. Memory system 350 may include on-chip memory such as level-1 data cache or scratch pad memory that is connected to a main memory through an off-chip level-2 cache system. Execution unit 142 executes load/store instructions that may access data locations in on-chip memory, external cache memory, or main memory. Processor 100 may share memory system 350 with other systems so that memory system 350 is not immediately available. Accordingly, the time required to complete a load or store depends on factors such as whether memory system is busy or there is a cache miss.

To reduce pipeline stalls, execution unit 142 contains an instruction queue 310 that holds up to four load/store instructions from issue control circuit 170. Each instruction in queue 310 indicates whether the instruction is a load or a store and a register number indicating a destination for a load instruction or a source of store data for a store instruction. When a load/store instruction is issued, a representation of the instruction is loaded in instruction queue 310 and an address generator 320 uses operands from latch 138 to calculate an effective address for the instruction. Depending on the addressing mode employed, effective address calculations may require one or two values from scalar register file 132 and/or an immediate value from the instruction. An address queue 325 holds the calculated effective addresses from address generator 320, and each address corresponds to the instructions in instruction queue 310.

A control circuit 330 controls internal operation of execution unit 142, an interface with memory system 350, and checks for dependencies between load and store instructions pending in execution unit 142. When a load/store instruction is issued to execution unit 142, control circuit 330 compares the newly generated address to addresses in address queue 325 to determine if a newly issued load instruction follows an earlier store instructions accessing the same address or a newly issued store instruction follows an earlier load or store instruction accessing the same address. If any of these dependencies are discovered, control circuit 330 generates a signal to prevent issue control circuit 170 from issuing any more load/store instructions to execution unit 142. Access of memory system 350 for the newly issued instruction is delayed until completing earlier instruction removes the instruction dependencies.

For access to memory system 350, control circuit 330 monitors a signal BUSY which indicates whether memory system 350 is ready to accept a request for a data transfer. When memory system is ready, a request is made for the next instruction and address in queues 310 and 325. The exemplary embodiment of processor 100 uses 32-bit effective addresses EA[31:0], but memory system 350 identifies 32-byte data vectors by the 27 most significant address bits EA[31:5]. An unaligned load or store of a data vector occurs when the least significant bits EA[4:0] of the effective address EA[31:0] are not equal to zero. For an unaligned load, execution unit 142 requests two data vectors from memory system 350, a 32-byte data vector from an address EA[31:5] and a 32-byte data vector from an address EA[31:5]+1; and aligner 340 constructs the requested load data vectors for storage in register file 130. For an unaligned store, memory system 350 stores the store data at the end of one cache line (EA[31:5]) and the start of the next cache line (EA[31:5]+1), and aligner 340 aligns the store data so that data elements are in the proper positions for both writes. In the exemplary embodiment of the invention, aligner 340 also executes inter-element move instructions that shift, shuffle, or otherwise change the locations of data elements within a data vector. Co-filed U.S. patent application Ser. No. UNKNOWN, entitled "MULTIFUNCTION DATA ALIGNER IN WIDE DATA WIDTH PROCESSOR" describes a suitable aligner for the exemplary embodiment and is incorporated by reference herein in its entirety.

If a load instruction is next in queues 310 and 325 when memory system is ready to accept a request, control circuit 330 asserts a request signal REQ and an address signal to memory system 350 and then waits for memory system 350 to return the data. Each request has a transaction ID to distinguish multiple pending requests. Memory system 350 grants read access to a data bus 345 and indicates a transaction ID for the data bus 345 when previously requested load data is available. For an unaligned load instruction, two aligned data vectors are requested, and aligner 340 aligns the load data for writing into register file 132 in two pieces.

When a store instruction is next in queues 310 and 325 and signal BUSY indicates memory system 350 will accept a request, control circuit 330 requests that read control 160 supply the store data and requests access to memory system 350. One cycle later, the store data is in latch 138 and store stage 242 begins if memory system grants access to data bus 345. During store stage 242, aligner 340 aligns the store data if necessary for an unaligned store operation, and control circuit 330 asserts the address from address queue 325 and the aligned store data to memory system 350. The store is then complete except for operations internal to memory system 350, and in store scoreboard 156, the store data register number for the completed store instruction can be removed.

Table 1 contains a sample code that illustrates the operation of processor 100.

TABLE 1

Sample Code

| loop: | |
|---|---|
| vadd.w VR3,VR2,VR1 | /* first */ |
| vadd.w VR5,VR4,VR3 | /* second */ |
| vstore.32 VR5,SR2,SR1 | /* third */ |
| vcbr.gt loop | /* fourth */ |

In Table 1, instruction vadd.x Ri,Rj,Rk is an ALU instruction that writes the sum of data elements from two registers Rj and Rk to a register Ri where ".x" indicates a data type for the data elements. Instruction vstore.32 VRi,SRj,SRk is a store instruction that stores a data vector from register VRi to an effective address determined from values in scalar registers SRj and SRk. Instruction vcbr.cc is a conditional branch where ".cc" indicates a condition that must be satisfied for the branch to be taken. The instructions in Table 1 have dependencies. In particular, the first instruction writes a result to register VR3 which provides a source operand for the second instruction, and the second instruction writes a result to register VR5 which provides the store data for the third instruction. In processor 100, these dependencies do not restrict decoding of the instructions.

For the code in Table 1, IFU 110 initially loads latch 114 with the first instruction, vadd.w VR3,VR2,VR1, which decoder 120 decodes during a first clock cycle. No instruction is initially loaded into latch 116 because decoder 122 cannot decode the second instruction, vadd.w VR5,VR4,VR3. At the end of the first clock cycle, assuming no pipeline stalls, IFU 110 loads the second instruction into latch 114 and the third instruction, vstore.32 VR5,SR2,SR1, into latch 116, and decoder 120 loads the register numbers for source operands VR1 and VR2 into latch 124.

During a second clock cycle, the first instruction advances to read stage 220, and read control circuit 160 selects the register numbers from latch A for reads from vector register file 130. Also, during the second clock cycle, decoders 120 and 122 decode the second and third instructions in parallel. At the end of the second cycle, IFU 110 loads the fourth instruction, vcbr.gt loop, into latch 116, decoders 120 and 122 load register numbers for source operands VR3, VR4, SR1, and SR2 into latches 124 and 126, and operands VR1 and VR2 from vector register file 130 are loaded via operand alignment multiplexer 134 loads into latch 136.

During a third clock cycle, the first instruction advances to execution stage 230 in execution unit 140, the second and third instructions advance to read stage 220, and the fourth instruction is decoded. For read stage 220 of the second and third instructions, read control circuit 160 detects the dependency of source register VR3 on the first instruction. Accordingly, read control circuit 160 selects source operands VR4, SR1, and SR2 to be read from register files 130 and 132 and selects source operand VR3 for operand forwarding. In the exemplary embodiment, execution unit 140 completes execution stage 230 for the first instruction, a "vadd" instruction with integer data elements, in one clock cycle so that the results from the first instruction can be forwarded for the second instruction. At the end of the third clock cycle, execution unit 140 provides the first instruction's result which is stored in latch 148 and stored in latch 136 via operand alignment multiplexer 134. The source operands read from register files 130 and 132 are also stored in latches 136 and 138. The decoded branch instruction requires a return of a condition code "gt" to IFU 110 after earlier instructions that could change the condition code have been completed. Accordingly, execution of the fourth instruction can be handled entirely by pipeline control unit 150. However, branch instructions with other addressing modes could require a read from scalar register file 132 of data to be returned to IFU 110 for a branch address calculation.

During a fourth clock cycle, the second and third instructions advance to execution stage 230 and address stage 232 respectively and the first instruction result is written from latch 148 to vector register file 130. The condition code for the branch instruction cannot be returned until the third instruction, i.e. the last instruction that could change the condition code, is completed. Accordingly, IFU 110 does not load any new instructions in latch 114 or 116 until the program order is established by the determination of whether the branch is taken. At the end of the fourth cycle the result from the third instruction is complete and stored in latch 148 and the address stage of the store instruction is complete. If, during the fourth cycle, memory system 350 is not busy and other load/store instructions are not in queues 310 and 325 before the third instruction, execution unit 142 requests store data, and read control circuit 160 selects to forward the store data from execution unit 140 to latch 138.

During a fifth clock cycle the condition code can be returned to IFU, the result from the second instruction is written to register VR5 in register file 130, and execution unit 142 can access the store data from latch 138 as soon as memory system 350 grants access to data bus 345.

Figure 4:
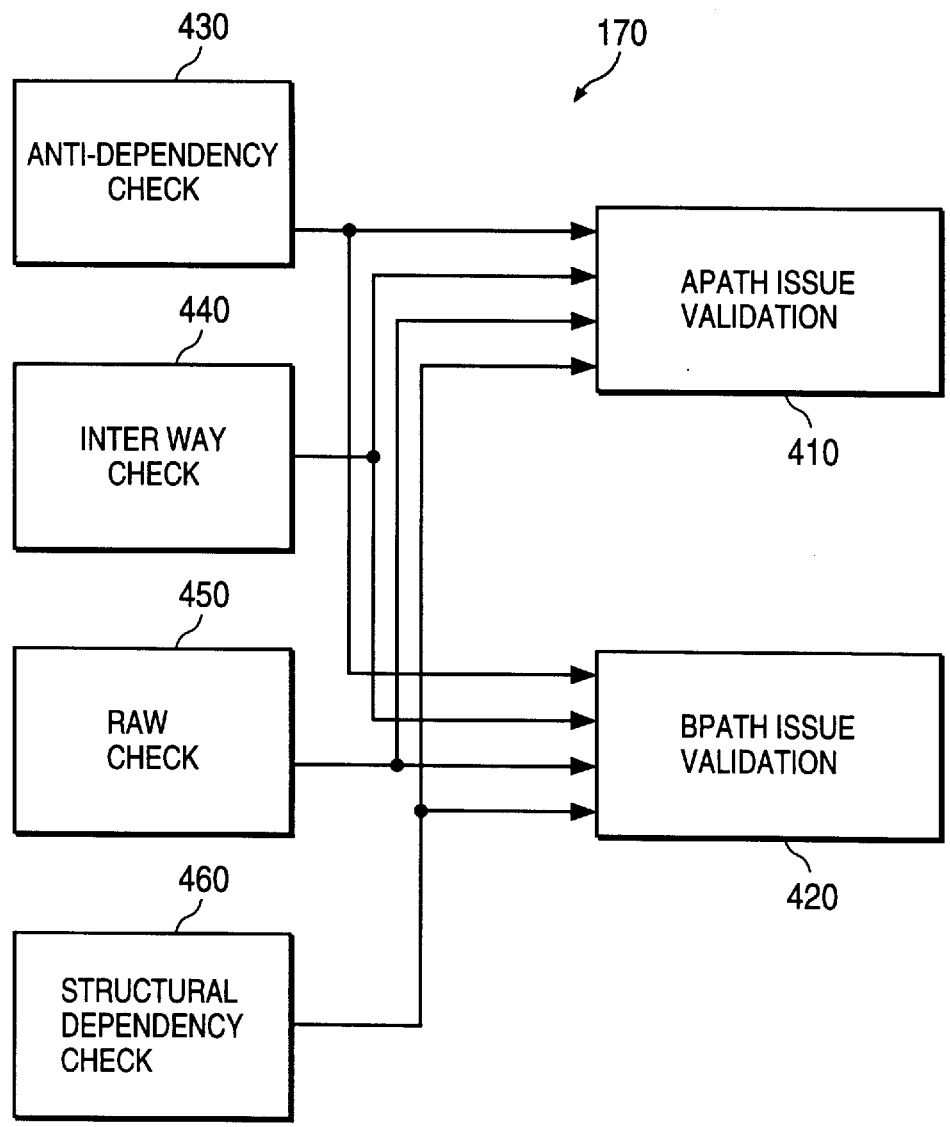
FIG. 4 is a block diagram of a circuit that controls issue of instructions to execution units in the processor of FIG. 1.

FIG. 4 is a block diagram of an embodiment of issue control circuit 170 of FIG. 1. In the embodiment shown, issue control circuit 170 includes an antidependency check block 430 coupled to store scoreboard 156, a WAW dependency check block 440 coupled to register file scoreboard 152, a RAW dependency check block 450 coupled to latches 136 and 138, and a structural dependency check block 460 coupled to resource scoreboard 154 and execution block 142. An Apath issue validation block 410 enables issue of an instruction to execution unit 140 if: check blocks 430 and 440 indicate that the destination operand of the instruction to be issued to execution unit 140 is not the source of store data for an issued store instruction and not the destination of any pending instruction; check block 460 indicates the required resource will be available for execution; and check block 450 indicates all of the required operands in latch 136 are valid. A Bpath issue validation block 410 enables issue of an instruction to execution unit 142 if: check blocks 430 and 440 indicate that the destination operand of the instruction to be issued to execution unit 142 is not the source of store data for an issued store instruction and not the destination of any pending instruction; check block 460 indicates execution unit 142 is ready to accept an instruction, i.e. has available space in instruction queue 310 and is not stalled; check block 450 indicates all of the required operands in latch 138 are valid, and Apath issue validation block 410 is not stalling issue of an instruction to execution unit 140.

Figure 5:
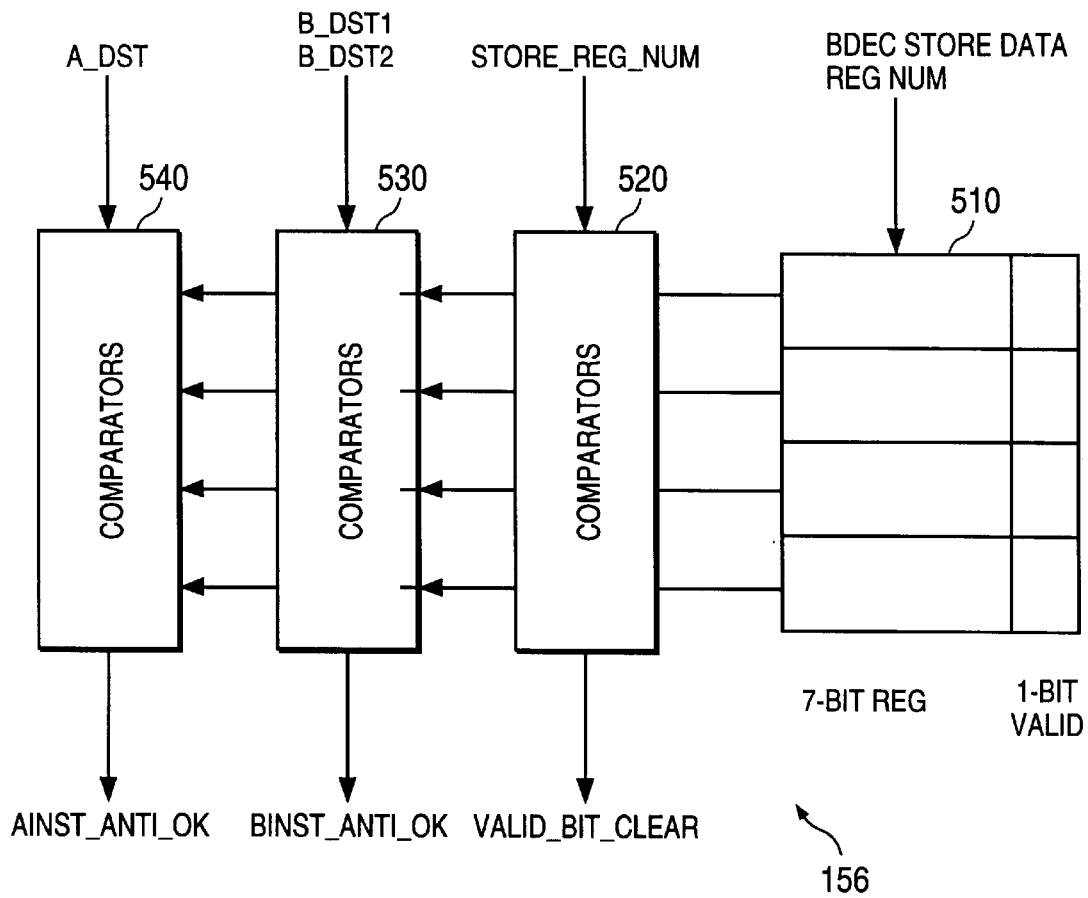
FIG. 5 is a block diagram of a store scoreboard for monitoring possible antidependency with issued store instructions.

FIG. 5 is a block diagram of an embodiment of store scoreboard 156 of FIG. 1. The embodiment shown includes a memory 510 having four 8-bit entries and three sets 520, 530, and 540 of 7-bit comparators. Four entries are used in the exemplary embodiment because at most four store instruction can be pending in execution unit 142 at the same time. When issue control circuit 170 issues a store instruction, a 7-bit register number identifying the register source of the store data is written to an entry in memory 510 and a valid bit in the entry is set. When execution unit 142 requests store data to complete a store instruction, a signal Store_Reg_Num is asserted to comparators 520; and if any of the valid entries contains a register number equal to signal Store_Reg_Num, the valid bit of that entry is cleared to invalidate the entry.

Antidependency check block 430 asserts to comparators 540 a signal A_DST indicating the destination register for the instruction being considered for issue to execution unit 140, and comparators 540 compare signal A_DST to the register numbers from valid entries in memory 510. If none of the register numbers from valid entries are equal to signal A_DST, the instruction does not have an antidependency with a pending store instruction, and a signal Ainst_anti_ok is asserted. Antidependency check block 430 also asserts to comparators 530 signals B_DST1 and B_DST2 indicating the destination registers for the instruction being considered for issue to execution unit 142, and comparators 530 compare signals B_DST1 and B_DST2 to the register numbers from valid entries in memory 510. If none of the register numbers from the valid entries in memory 510 are equal to either signal B_DST1 or B_DST2, the instruction does not have an antidependency with a pending store instruction, and a signal Binst_anti_ok is asserted.

Figure 6:
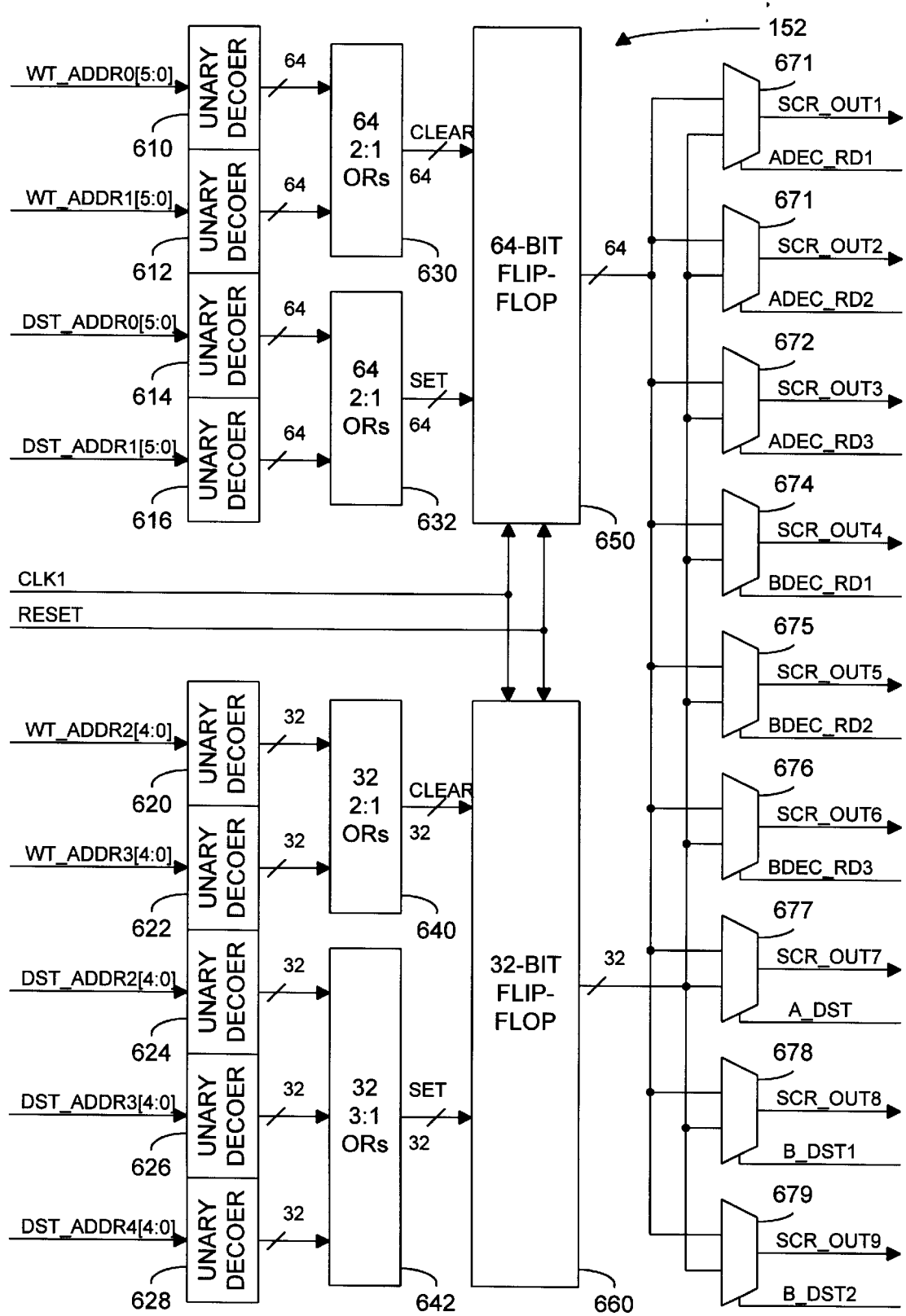
FIG. 6 is a block diagram of a register file scoreboard for monitoring read-after-write and write-after-write instruction dependencies.

FIG. 6 illustrates an exemplary embodiment of register file scoreboard 152. In the exemplary embodiment, register file scoreboard 152 includes a 64-bit flip-flop 650 having one bit for each of vector registers VR0 to VR63 and a 32-bit filp-flop 660 having one bit for each of scalar registers SR0 to SR31. A bit in flip-flop 650 or 660 is set if the bit is associated with a register that is a destination operand of an instruction issued to execution unit 140 or 142. When an instruction is completed and a result is written to the destination register, the bit in flip-flop 650 or 660, associated with the destination register is cleared.

Multiplexers 671 to 679 read individual bits from flip-flops 650 or 660. Read control circuit 160 uses multiplexers 671 to 676 to determine if any of the pending instruction writes to source operands indicated by the up to six register numbers in latches 124 and 126. If any of signals SCR_OUT1 to SCR_OUT6 is asserted (high), the register identified by the associated one of multiplexer select signals ADEC_RD1 to ADEC_RD3 and BDEC_RD1 to BDEC_RD3 has RAW dependeny and is determined by operand forwarding rather than a read. WAW check block 440 in issue control circuit 170 uses multiplexers 677 to 679 to determine whether destination operands of instructions being considered for issue to execution unit 140 and 142 are the destination operands for any pending instruction. Signals A_DST, B_DST1, and B_DST2 identify the destination registers of instructions being considered for issue and are select signals for multiplexers 677 to 678.

Each cycle up to two instructions can be issued. For the exemplary embodiment, execution unit 140 executes instructions that have at most one destination register, a vector register identified by a destination signal DST_ADDR0[5:0] or a scalar register identified by a destination signal DST_ADDR2[4:0]. Execution unit 142 executes instructions that have at most two destination registers selected from a vector register identified by a destination signal DST_ADDR1[5:0] and two scalar registers identified by destination signals DST_ADDR3[4:0] and DST_ADDR4[4:0]. Unary converters 614, 616, 624, 626, and 628 and OR gates 632 and 642 convert these destination signals to signals which set the individual bits in flip-flops 650 or 660 when instructions are issued.

When results are written to register files 130 and 132, write control circuit 180 asserts write-address signals WT_ADDR0 to WT_ADD3 identifying the register written to unary converters 610, 612, 620, and 622. Unary converters 610, 612, 620, and 622 and OR gates 630 and 640 convert these write-address signals to signals that clear the individual bits in flip-flops 650 or 660 corresponding to the write-address signals.

Although the invention has been described with reference to particular embodiments, the description is only an example of the invention's application and should not be taken as a limitation. Various adaptations and combinations of features of the embodiments disclosed are within the scope of the invention as defined by the following claims.

We claim:

1. A superscalar processor comprising:
a first instruction decoder adapted for decoding a first class of instructions;
a second instruction decoder adapted for decoding a second class of instructions, the second class including load/store instructions;
a first execution unit adapted for executing instructions in the first class;
a second execution unit adapted for executing instructions in the second class;
a register file coupled to supply source operands to the first and second execution units; and
a read control circuit coupled to the register file, the first and second instruction decoders, and the second execution unit, wherein for each clock cycle, the read control circuit selects from among operands identified by the first decoder, operands identified by the second decoder, and a store operand for a store instruction, if any store instruction is pending in the second execution unit, to determine which operands are read from the register file during the clock cycle.

2. The superscalar processor of claim 1, wherein:
the register file includes a set of read ports that are insufficient to simultaneously prove a store operand for a first instruction and source operands for a second instruction and a third instruction, and wherein
if there is a pending store instruction requiring a store operand, then:
the read control circuit selects the store operand;
the read control circuit further selects the source operands identified by the first decoder if the read ports are sufficient to simultaneously provide the store operand and the source operands identified by the first decoder; and
the read control circuit further selects the source operands identified by the second decoder if the read ports are sufficient to simultaneously provide the store operand, the source operands identified by the first decoder, and the source operands identified by the second decoder.

3. The superscalar processor of claim 2, wherein the read control comprises means for stalling the second decoder if the read ports of the register file are not sufficient to simultaneously provide the store operand, the source operands identified by the first decoder, and the source operands identified by the second decoder.

4. The superscalar processor of claim 3, wherein the read control further comprises means for stalling the first decoder if the read ports of the register file are not sufficient to simultaneously provide the store operand and the source operands identified by the first decoder.

5. A superscalar processor comprising:
a first instruction decoder adapted for decoding a first class of instructions;
a second instruction decoder adapted for decoding a second class of instructions, the second class including load/store instructions;
a first execution unit adapted for executing instructions in the first class;
a second execution unit adapted for executing instructions in the second class;
a register file coupled to supply source operands to the first and second execution units;
a read control circuit coupled to the register file, the first and second instruction decoders, and the second execution unit, wherein for each clock cycle, the read control circuit selects from among operands identified by the first decoder, operands identified by the second decoder, and a store operand for a store instruction pending in the second execution unit to determine which operands are read from the register file during the clock cycle;
a scoreboard circuit that stores information identifying registers that supply store data; and
an issue control circuit coupled to the scoreboard circuit, wherein the issue control circuit issues instructions to the first and second execution units, and comprises:
means for setting the scoreboard circuit when the issue control circuit issues a store instruction, so that the scoreboard circuit identifies a register that supplies store data for the issued store instruction; and
an interlock circuit coupled to disable issue of instructions having a destination identified by the scoreboard circuit.

6. The processor of claim 5, wherein the scoreboard circuit comprises a memory for storage of a list of register numbers, and the means for setting the scoreboard circuit writes a register number to an entry in the list when a store instruction is issued.

7. The processor of claim 6, further comprising means for removing a register number from the list in response to reading the store data from a register corresponding to the register number.

8. The processor of claim 6, wherein the second execution unit contains a queue for storage of information relating to multiple instructions being executed by the second execution unit, and the list in scoreboard circuit and the queue in the second execution unit contains the same number of entries.

9. A method for operating a superscalar processor, comprising:
simultaneously decoding a store instruction and a second instruction that generates store data for the store instruction;
simultaneously reading operands required for execution of the store instruction and the second instruction, wherein the operands include operands required for calculation of an effective address used by the store instruction;
simultaneously issuing the store instruction to a first execution unit and the second instruction to a second execution unit; and
requesting store data for the store instruction when required by the first execution unit for execution of the store instruction.

10. The method of claim 9, further comprising forwarding a result of the second instruction from the second execution unit to the first execution unit in response to the requesting of store data.

11. The method of claim 9, further comprising:
writing a result of the second instruction from the second execution unit to a register file; and
reading the result from the register file in response to the requesting of store data.

12. A method for operating a superscalar processor, comprising:
reading operands required for calculation of an address for the store instruction;
issuing the store instruction to an execution unit;
setting a scoreboard circuit when issuing the store instruction, so that the scoreboard circuit identifies a source of store data for the store instruction;

preventing issue of any instruction that has a destination operand that the scoreboard identifies as a source of store data;

requesting store data for the store instruction when required by the first execution unit for execution of the store instruction; and resetting the scoreboard circuit when the store instruction is completed, so that the scoreboard circuit to no longer identifies the source of the store data for the store instruction.

13. The method of claim 12, wherein setting the scoreboard circuit comprises writing a register number associated with the source of the store data to an entry in a list of register numbers.

14. The method of claim 13, wherein resetting the scoreboard comprises invalidating the entry in the list of register numbers.

* * * * *